United States Patent
Reams

(10) Patent No.: US 9,117,362 B2
(45) Date of Patent: *Aug. 25, 2015

(54) METHODS AND APPARATUS FOR LEARNING REMOTE CONTROL COMMANDS

(75) Inventor: William R. Reams, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 344 days.

This patent is subject to a terminal disclaimer.

(21) Appl. No.: 13/610,624

(22) Filed: Sep. 11, 2012

(65) Prior Publication Data

US 2012/0328300 A1 Dec. 27, 2012

Related U.S. Application Data

(63) Continuation of application No. 12/390,268, filed on Feb. 20, 2009, now Pat. No. 8,400,344.

(51) Int. Cl.
| | |
|---|---|
| *G08B 5/00* | (2006.01) |
| *G08C 17/02* | (2006.01) |
| *G08C 23/04* | (2006.01) |
| *B60R 25/10* | (2013.01) |
| *G05B 11/01* | (2006.01) |
| *G08C 19/28* | (2006.01) |
| *H04N 5/60* | (2006.01) |
| *G06F 3/033* | (2013.01) |

(52) U.S. Cl.
CPC ............... *G08C 17/02* (2013.01); *G08C 19/28* (2013.01); *G08C 23/04* (2013.01); *G06F 3/033* (2013.01); *G08C 2201/40* (2013.01); *G08C 2201/92* (2013.01); *H04N 5/602* (2013.01)

(58) Field of Classification Search
USPC ......................... 340/815.6, 426.36, 12.22, 4.3
See application file for complete search history.

(56) References Cited

U.S. PATENT DOCUMENTS

| | | | |
|---|---|---|---|
| 4,706,121 A | 11/1987 | Young | |
| 4,841,368 A * | 6/1989 | Rumbolt et al. | ............... 348/734 |
| 5,671,267 A | 9/1997 | August et al. | |

(Continued)

FOREIGN PATENT DOCUMENTS

WO 03083588 A2 10/2003

OTHER PUBLICATIONS

USPTO "Non-Final Office Action" mailed Aug. 31, 2012 for U.S. Appl. No. 12/492,955.

(Continued)

*Primary Examiner* — Fekadeselassie Girma
(74) *Attorney, Agent, or Firm* — Ingrassia Fisher & Lorenz, P.C.

(57) ABSTRACT

Described herein are various techniques for transferring command codes between multiple remote controls. A first controlled device receives a signal from a remote control associated with a second controlled device. The signal is associated with a command for the second controlled device. The first controlled device receives user input, assigning the command to a selected button of a second remote control. The first controlled device transmits a message to the second remote control. The message includes information utilized by the second remote control to reproduce the signal responsive to actuation of the selected button, allowing the second remote control to generate the command for the second controlled device.

18 Claims, 4 Drawing Sheets

(56) References Cited

U.S. PATENT DOCUMENTS

| | | | |
|---|---|---|---|
| 5,963,624 A | 10/1999 | Pope | |
| 6,747,568 B1 | 6/2004 | Teskey | |
| 7,538,686 B2 | 5/2009 | Yeh et al. | |
| 7,589,642 B1 | 9/2009 | Mui | |
| 7,853,773 B1 | 12/2010 | Chan | |
| 7,916,040 B2* | 3/2011 | Andersen et al. | 340/12.22 |
| 7,956,792 B2 | 6/2011 | Chen et al. | |
| 7,973,648 B2* | 7/2011 | Kawakita | 340/13.24 |
| 8,116,889 B2* | 2/2012 | Krzyzanowski et al. | 700/90 |
| 8,233,803 B2 | 7/2012 | Meyer et al. | |
| 8,400,344 B2* | 3/2013 | Reams | 341/176 |
| 2002/0130803 A1 | 9/2002 | Conway et al. | |
| 2004/0070491 A1 | 4/2004 | Huang et al. | |
| 2005/0110651 A1* | 5/2005 | Martis et al. | 340/825.69 |
| 2005/0151726 A1 | 7/2005 | Wouters | |
| 2006/0232377 A1* | 10/2006 | Witkowski | 340/5.25 |
| 2007/0273655 A1 | 11/2007 | Yeh et al. | |
| 2009/0322583 A1 | 12/2009 | Reams et al. | |

OTHER PUBLICATIONS

USPTO "Final Office Action" mailed Apr. 2, 2013 for U.S. Appl. No. 12/492,955.
USPTO, Non-Final Office Action mailed Feb. 4, 2014 for U.S. Appl. No. 12/492,955.
European Patent Office, Extended Search Report, dated Oct. 23, 2014 for European Patent Application No. 10154143.1.

* cited by examiner

METHODS AND APPARATUS FOR LEARNING REMOTE CONTROL COMMANDS

CROSS-REFERENCES TO RELATED APPLICATIONS

This Application claims priority to U.S. Non-Provisional application Ser. No. 12/390,268, filed Feb. 20, 2009.

BACKGROUND

Television receivers, such as cable or satellite set-top boxes, often include a universal remote control capable of controlling other devices, such as televisions, audio receivers and DVD players. Typically, the universal remote control will include a memory storing remote control command sets for various common devices, such as popular models of televisions, VCRs and the like. However, there are typically command sets for some devices which are not stored in the memory of the universal remote control, often because the device is not popular enough to warrant inclusion in the database or because the remote control manufacturer is not aware of the device. Thus, many remote controls include a learning function, allowing the remote control to "learn" commands from other remote controls. The inclusion of the learning functionality within the remote control contributes to an increased cost and size of the remote control. Additionally, for devices that include multiple remote controls, such as multiple room television receivers, the learning functionality is included within each remote control, causing the consumer to purchase duplicative equipment at an increased cost for the television receiver.

BRIEF DESCRIPTION OF THE DRAWINGS

The same number represents the same element or same type of element in all drawings.

DETAILED DESCRIPTION

The various embodiments described herein generally provide apparatus, systems and methods for learning remote control commands from a remote control for use by another remote control. A first controlled device, such as a television receiver, receives a signal from a remote control associated with a second controlled device, such as a television. The signal is associated with a command for the second controlled device. The first controlled device receives user input, assigning the command to a selected button of a second remote control or other input device of the second remote control. The first controlled device then transmits a message to the second remote control. The message includes information utilized by the second remote control to reproduce the signal responsive to actuation of the selected button, allowing the second remote control to generate the command for the second controlled device. In short, the various embodiments described herein allow a controlled device to learn commands from a remote control associated with another device and transmit the commands to a second remote control for utilization by that remote control in controlling the other device.

The controlled device is described herein as an entertainment device. More specifically, the controlled device may be described herein as a television receiver, e.g., a cable television receiver or a satellite television receiver. However, it is to be appreciated that the teachings described herein may be applied to other combinations of remote controls and controlled devices. For example, the teachings described herein may be applied to household appliances, computers and wireless peripherals (e.g., keyboards, mice and pointing devices), automobile keyless entry systems, home security systems, child locator systems, digital video recorders (DVRs), DVD players, video servers, audio receivers, audio playback systems and the like.

Figure 1:
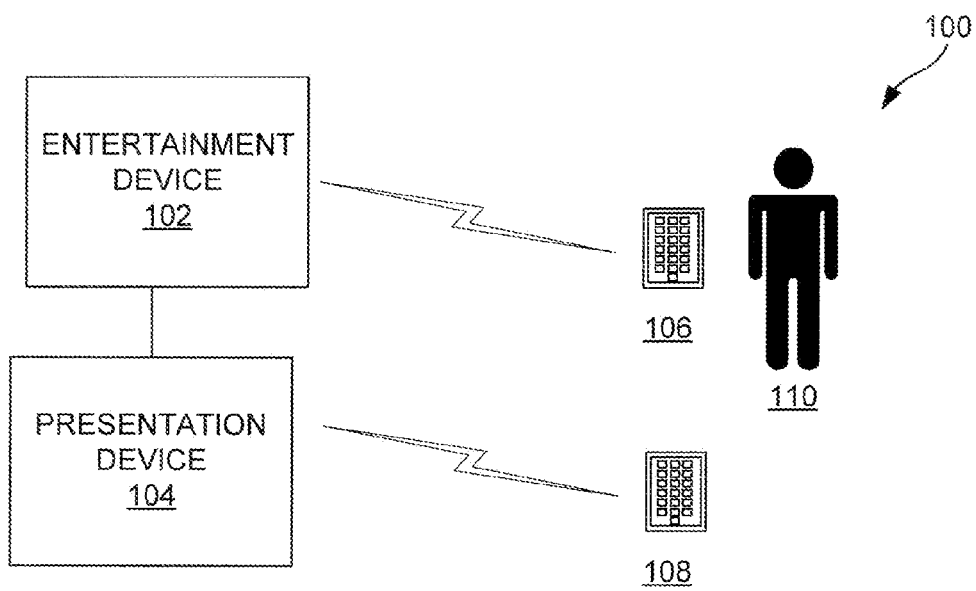
FIG. 1 illustrates an embodiment of an entertainment system.

FIG. 1 illustrates an embodiment of an entertainment system 100. The entertainment system 100 is operable for presenting content to a user 110. The entertainment system 100 includes an entertainment device 102, a presentation device 104, a first remote control 106 and a second remote control 108. Each of these components is discussed in greater detail below. The entertainment system 100 may include other elements, components or devices not illustrated for the sake of brevity.

The entertainment device 102 is operable to receive content from one or more content sources (not shown in FIG. 1), and to present the received content to the user 110 on the associated presentation device 104. In at least one embodiment, the presentation device 104 is a display device (e.g., a television) configured to display content to the user 110. The entertainment device 102 may receive an audio/video stream in any format (e.g., analog or digital format), and output the audio/video stream for presentation by the presentation device 104. The entertainment device 102 may be further configured to display menus and other information that allow a user 110 to control the output of content by the entertainment device 102.

The presentation device 104 may comprise any type of device operable to present content to the user 110. In one embodiment, the presentation device 104 comprises a display device, such as a television, display monitor and the like. In other embodiments, the presentation device 104 comprises an audio playback device, such as an audio receiver, stereo system and the like. The entertainment device 102 and the presentation device 104 may be communicatively coupled using any type of wired or wireless connection, including coaxial cable, component or composite video cables, High Definition Multimedia Interface (HDMI) cabling, WiFi, Ethernet and the like.

The first remote control 106 may be any system or apparatus configured to remotely control the output of content by the entertainment device 102. The first remote control 106 receives input from the user 110 and responsively generates commands regarding the operation of the entertainment device 102. For example, the remote control 106 may communicate commands to the entertainment device 102 requesting to playback content, temporally move through content (e.g., fast-forward or reverse), adjust the volume, access electronic programming guides, menus and the like. In at least one embodiment, the first remote control 106 may output infrared (IR) key codes to remotely command the entertainment device 102. In other embodiments, the first remote control 106 may issue commands to the entertainment device 102 via an RF communication protocol.

The first remote control 106 is operable to bidirectionally communicate with the entertainment device 102, allowing the first remote control 106 to exchange data with the entertainment device 102. For example, the first remote control 106 may download firmware updates, updated command sets for other devices and the like from the entertainment device 102. The first remote control 106 may communicate with the entertainment device 102 using any type of wireless interface, such as IR communication links or radio frequency (RF) communication links.

The first remote control 106 is further configured as a "universal" remote control, operable to remotely control other devices, such as the presentation device 104. In at least one embodiment, the first remote control 106 stores command sets in memory for various devices, such as televisions, DVD players, VCRs and the like. Such command sets may be stored in a read only memory (ROM) or may be stored in an updateable storage medium, such as a flash memory. In at least one embodiment, the first remote control 106 may include an updateable storage medium, such as flash, to store command sets for devices configured to operate with the first remote control 106. For example, the entertainment device 102 may transfer selected command sets to the first remote control 106 responsive to configuration of the first remote control 106 to remotely operate a particular device.

The second remote control 108 is configured to remotely operate the presentation device 104. The second remote control 108 receives input from the user 110 and responsively generates commands for the presentation device 104. For example, the second remote control 108 may output IR key codes compatible with the presentation device 104, controlling various functions, such as powering on/off the presentation device 104, changing the volume, changing the channel and the like. In at least one embodiment, the second remote control 108 and the presentation device 104 may communicate using RF communication links and protocols, such as Bluetooth, WiFi and the like.

In at least one scenario, the first remote control 106 is not initially configured to remotely operate the presentation device 104. In other words, the first remote control 106 may not initially store a command set compatible with the presentation device 104. However, the command set for the presentation device 104 may be "learned" by the entertainment device 102 and transmitted to the first remote control 106 for utilization in controlling the second presentation device 104.

In at least one embodiment, the user 110 may provide input to the entertainment device 102, requesting to enter a learning mode of the entertainment device 102. Such input may be provided for example, from the first remote control 106. The user 110 further utilizes the second remote control 108 to output a signal operable to control the presentation device 104. The signal is associated with a command for the presentation device 104, e.g., a channel change command.

The entertainment device 102 receives the signal from the second remote control 108 via a signal receiver, such as an IR receiver or an RF receiver. The entertainment device 102 further receives input assigning the command corresponding with the signal to a particular button of the first remote control 106. In other embodiments, the command may be assigned to a trackball, joystick, capacitive or resistive sensing touchpad or other input device of the first remote control 106. In at least one embodiment, the user 110 provides the assignment input via the first remote control 106. However, the input may alternatively be provided via a front panel button or other input device of the entertainment device 102 or via another remote control associated with the entertainment device 102.

The entertainment device 102 processes the signal and the assignment input to generate a message for the first remote control 106. The message includes information utilized by the first remote control 106 to reproduce the signal responsive to actuation of the selected button to generate a command for the presentation device 104. For example, the message may reference a particular button of the first remote control 106 and an IR key code to be output by an IR emitter of the first remote control 106. In at least one embodiment, the message includes information for the first remote control 106 to reproduce an RF command signal responsive to actuation of the selected button.

After completion of the learning process, the user 110 may utilize the first remote control 106 to remotely control the presentation device 104. Thus, the first remote control 106 is configured to control both the entertainment device 102 and the presentation device 104. For example, upon actuation of a selected button, the first remote control 106 may output an IR pattern compatible with the presentation device 104 and associated with a particular requested command.

Because the reception and processing of the signal from the second remote control 108 is performed by the entertainment device 102 rather than first remote control 106, the complexity and cost of the first remote control 106 is reduced. For example, the need for an IR receiver in the first remote control 106 may be eliminated and/or instructions operable by processing logic of the first remote control 106 may be reduced. Further, if the entertainment device 102 includes multiple associated first remote controls 106, then the signal receiving equipment may be centrally located at the entertainment device 102 rather than duplicated in each first remote control 106.

Figure 2:
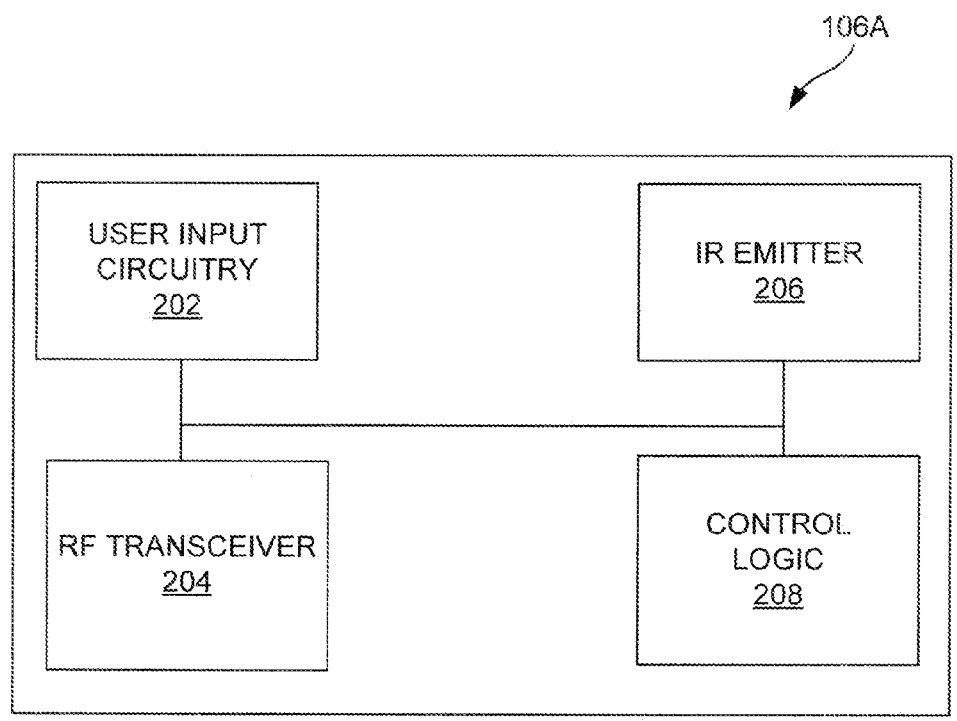
FIG. 2 illustrates an embodiment of a first remote control of FIG. 1.

FIG. 2 illustrates an embodiment of a first remote control of FIG. 1. FIG. 2 will be discussed in reference to the entertainment system 100 illustrated in FIG. 1. The remote control 106A includes user input circuitry 202, a wireless RF transceiver 204, an IR emitter 206 and control logic 208. Each of these components is discussed in greater detail below. The remote control 106A may contain other devices not described herein for the sake of brevity.

The user input circuitry 202 is operable to receive and/or process user input from the user 110 (see FIG. 1). In at least one embodiment, the user input circuitry 202 is a keypad including a set of buttons. The user 110 may utilize the keypad to input channel numbers, control the volume of the entertainment device 102, navigate menus, manipulate the output of content by the entertainment device 102 and/or control other functions of the entertainment device 102 and/or the presentation device 104.

The wireless transceiver 204 is operable to bi-directionally communicate with the entertainment device 102 (see FIG. 1) and/or the presentation device 104. In the illustrated embodiment, the wireless transceiver 204 may utilize an RF communication link to communicate with the entertainment device 102. The wireless transceiver 204 may utilize any type of RF communication protocol to communicate with the entertainment device, such as Bluetooth, WiFi, ZigBee and the like.

The wireless transceiver 204 is operable to transmit a key code and/or command message corresponding with user input to the entertainment device 102 (see FIG. 1). The wireless transceiver 204 is also operable to exchange other data with the entertainment device 102, such as operational status queries and responses. For example, the wireless transceiver 204 may transmit queries to the entertainment device 102 responsive to a pre-defined schedule. The wireless transceiver 204 may also receive IR database key codes, RF database key codes or firmware updates from the entertainment device 102 responsive to the queries. Data received from the entertainment device 102 by the wireless transceiver 204 is transferred to the control logic 208 for processing.

The IR emitter 206 is operable to output IR keycodes to the presentation device 104 responsive to user input received by the user input circuitry 202. In at least one embodiment, the IR emitter 206 is operable to output a series of IR pulses in order to reproduce a signal associated with a particular command of the presentation device 104 (see FIG. 1). The remote control 106A may include memory, such as flash, for storing information utilized by the IR emitter 206 to reproduce particular signals for transmission to the presentation device 104. In some embodiments, the remote control 106A may communicate with the entertainment device 102 using a bi-directional IR communication link and IR emitter 206 may take the form of an IR transceiver.

The control logic 208 is operable to control the operation of the remote control 106A. The control logic 208 may be a single processing device or a plurality of processing devices that cooperatively operate to control the operation of the remote control 106A. The operation of the control logic 208 may be controlled by instructions executable by the control logic 208. Some examples of instructions are software, program code, and firmware.

The control logic 208 is operable to generate control commands for the entertainment device 102 responsive to the input provided to the user input circuitry 202 by the user 110 (see FIG. 1). Such commands for the entertainment device 102 are transmitted to the entertainment device 102 by the wireless transceiver 204. The control commands may be in the form of key codes or other commands that are compatible with the entertainment device 102.

The control logic 208 is also operable to process data received from the entertainment device 102. For example, the control logic 208 may receive IR key codes for the presentation device 104 from the entertainment device 102. The IR key codes may include instructions for reproducing the IR key codes and a particular button or other input sequence associated with the command. The commands may be stored in the remote control 106A by the control logic 208 for subsequent utilization.

The control logic 208 is operable to command the IR emitter 206 to output control commands for the presentation device 104 responsive to the user input circuitry 202 by the user 110. The control logic 208 is operable to receive input from the user input circuitry 202, identify the corresponding IR key code for the presentation device 104 and provide the IR key code to the IR emitter 206 for output. In at least one embodiment, the user input circuitry 202 may include a button or other input device allowing the user 110 to transition between providing input for the entertainment device 102 and the presentation device 104.

Figure 3:
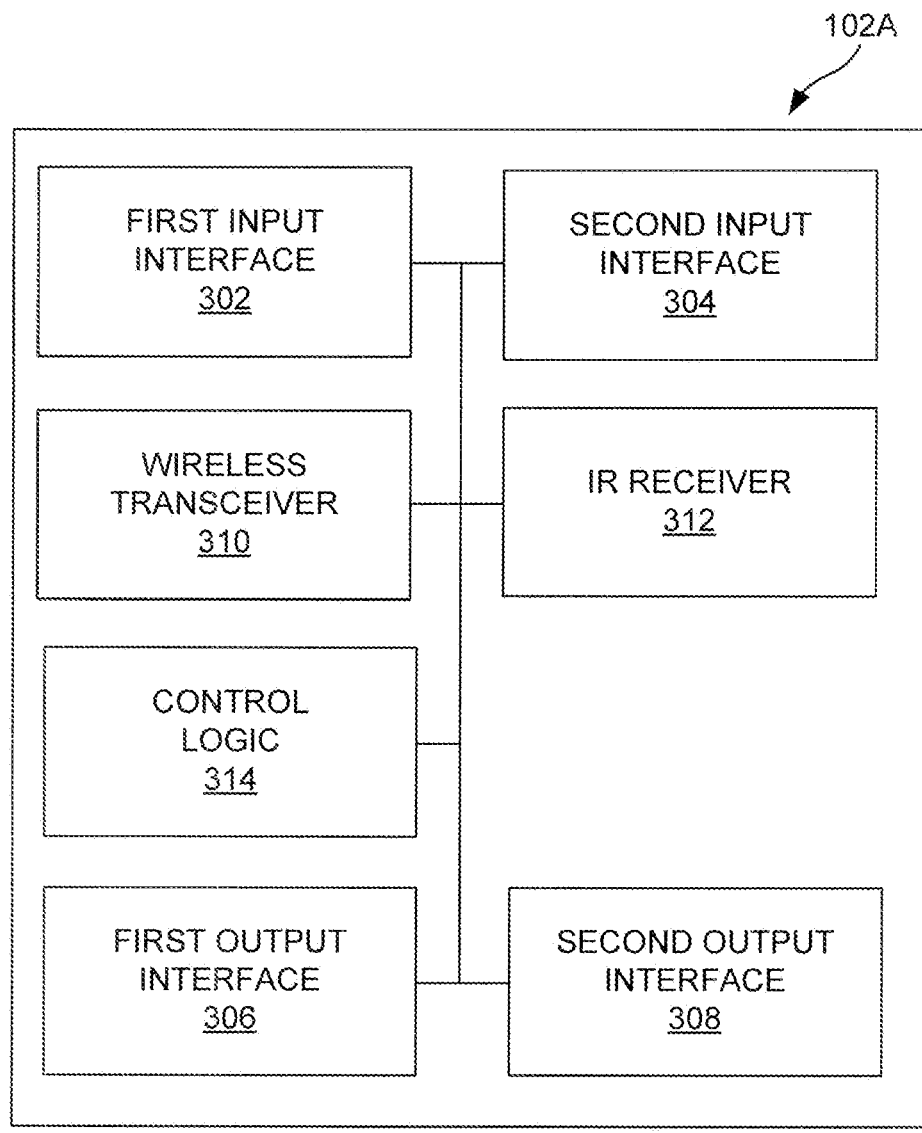
FIG. 3 illustrates an embodiment of an entertainment device of FIG. 1.

FIG. 3 illustrates an embodiment of an entertainment device of FIG. 1. The entertainment device 102A will be described in reference to the entertainment system 100 described in FIGS. 1 and 2. The entertainment device 102A includes a first input interface 302, a second input interface 304, a first output interface 306, a second output interface 308, a wireless transceiver 310, an IR receiver 312 and control logic 314. Each of these components is discussed in greater detail below. The entertainment device 102A may include other components, elements or devices not illustrated for the sake of brevity.

The first input interface 302 is operable to receive a first input stream from a content source (not shown in FIG. 3). The first input interface 302 may receive any type of audio, video or audio/video (A/V) presentation stream in any kind of format. In at least one embodiment, the first input interface 302 may comprise a television tuner, such as a satellite television tuner, a cable television tuner, a terrestrial television tuner or an internet television receiver that receives content from a content provider.

The second input interface 304 is operable to receive a second input stream from a content source (not shown in FIG. 3). The second input interface 304 may be similar to the first input interface 302, and receive similar type of content from a similar or identical content source. For example, the first input interface 302 may comprise a first satellite television tuner of the entertainment device 102A and the second input interface 304 may comprise a second satellite television tuner of the entertainment device 102A. The first and second input interfaces 302 and 304 may also receive different types of content from different content sources. For example, the first input interface 302 may comprise a satellite television tuner and the second input interface 304 may comprise an over-the-air terrestrial television tuner.

The first output interface 306 is operable to output content for presentation by a first presentation device (e.g., presentation device 104). More particularly, the first output interface 306 is operable to output a first output stream based on the first input stream. Similarly, the second output interface 308 is operable to output content for presentation by a second presentation device based on the second input stream. The first and second output interfaces 306 and 308 may output content modulated into any format and protocol and may be communicatively coupled with the presentation devices over any type of wireless or wired communication medium.

The wireless transceiver 310 is operable to communicate with the remote control 106A (see FIG. 2) to exchange data, such as command codes, firmware updates, IR database codes, status queries/responses and the like. In at least one embodiment, the wireless transceiver 310 communicates with the wireless transceiver 204 of the remote control 102A (see FIG. 2) using a RF communication link, such as WiFi, Bluetooth, ZigBee and the like. The wireless transceiver 310 may comprise any type of RF transceiver. In at least one embodiment, the RF transceiver may be operable to communicate with multiple types of devices using disparate communication protocols. For example, the RF transceiver may be operable to communicate using both the WiFi and Bluetooth protocols.

In at least one embodiment, the wireless transceiver 310 may be operable to communicate with multiple remote controls 106A, such as a remote control that controls the output of content by the first output interface 306 and another remote control that controls the output of content by the second output interface 308. The wireless transceiver 310 may utilize different channels, different identifiers, packet switching and the like to differentiate communications between multiple remote controls.

The IR receiver 312 is operable to receive IR signals from the second remote control 108 (see FIG. 2). The IR receiver 312 receives an IR signal, communicated from the second remote control 108 and transmits the signal to the control logic 314 for further processing.

The control logic 314 is operable to control the operation of the entertainment device 102A. The control logic 314 may be a single processing device or a plurality of processing devices that cooperatively operate to control the operation of the remote control 106A. The operation of the entertainment device 102 may be controlled by instructions executable by the control logic 314. Some examples of instructions are software, program code, and firmware. Some examples of instructions are software, program code, and firmware. Additionally, the operation of particular functionalities of the control logic 314 is controllable based on commands received from a remote control 106A (see FIG. 2).

In at least one embodiment, the control logic 314 is operable for receiving presentation content, e.g., video content from either the first input interface 302 or the second input interface 304. The control logic 314 is further operable to control the output of the content received by the first input interface 302 to the first output interface 306 as well as the output of the content received by the second input interface 306 to the second output interface 308.

The control logic 314 may also receive or retrieve content from a storage medium, such as an optical disk, internal or external hard drive, a portable storage device (e.g., universal serial bus (USB) memory sticks) and the like. The control logic 314 may also receive content from external servers, such as video servers, that are communicatively coupled to the entertainment device 102A over the internet or other type of data network.

The control logic 314 may operate to perform various signal and data processing functions such as demodulation, decoding, decryption and the like on data signals received via any type of network interface, to generate an appropriate format video stream for output to the presentation device 104 (see FIG. 1). The control logic 314 may comprise multiple components, such as a demodulator, an audio decoder, a video decoder, a data decoder or a graphics processor to generate the video stream.

Commands received from the remote control 106A are operable to control the output of audio and video content by the control logic 314. For example, the wireless transceiver 310 may receive a key code causing control logic 314 to manipulate the output of the video content responsive to the key code. The control logic 314 operates to output a video stream for presentation by the presentation device 104 via the first or second output interfaces 306 or 308. The video stream generated by the control logic 314 may include menus, electronic programming guides and the like that are navigable using commands received from the remote control 106A.

The control logic 314 is also operable to perform a configuration process, allowing any remote control 106A to learn commands for a remote control 108 (see FIG. 1) of another device, such as the presentation device 104. For example, the user 110 may initiate a configuration process via input to the first remote control 106A or via other input devices associated with the entertainment device 102A, such as front panel controls of the entertainment device 102A.

The IR receiver 312 receives a signal from the second remote control 108. In at least one embodiment, the signal is an IR key code associated with a command for the presentation device 104 (see FIG. 1). The control logic 314 receives and processes the signal and input assigning the signal to a particular button or other input device of the remote control 106A.

The control logic 314 may be operable to output a menu, via the first output interface 306 and/or the second output interface 308, that solicits the assignment input from the user 110. In at least one embodiment, the user 110 provides the assignment input via the remote control 106A. For example, the user 110 may press a particular button on the remote control 106A to assign a command to the button. In some embodiments, the user 110 may provide input via a front panel keypad, button or other input device associated with the entertainment device 102A.

The control logic 314 processes the signal received from the second remote control 108 and the assignment information and generates a message for transmission to the first remote control 106A. The wireless transceiver 310 then transmits the message to the first remote control 106A. The first remote control 106A receives the message and subsequently utilizes the message to reproduce the signal responsive to actuation of a selected button to generate the command for the presentation device 104.

Figure 4:
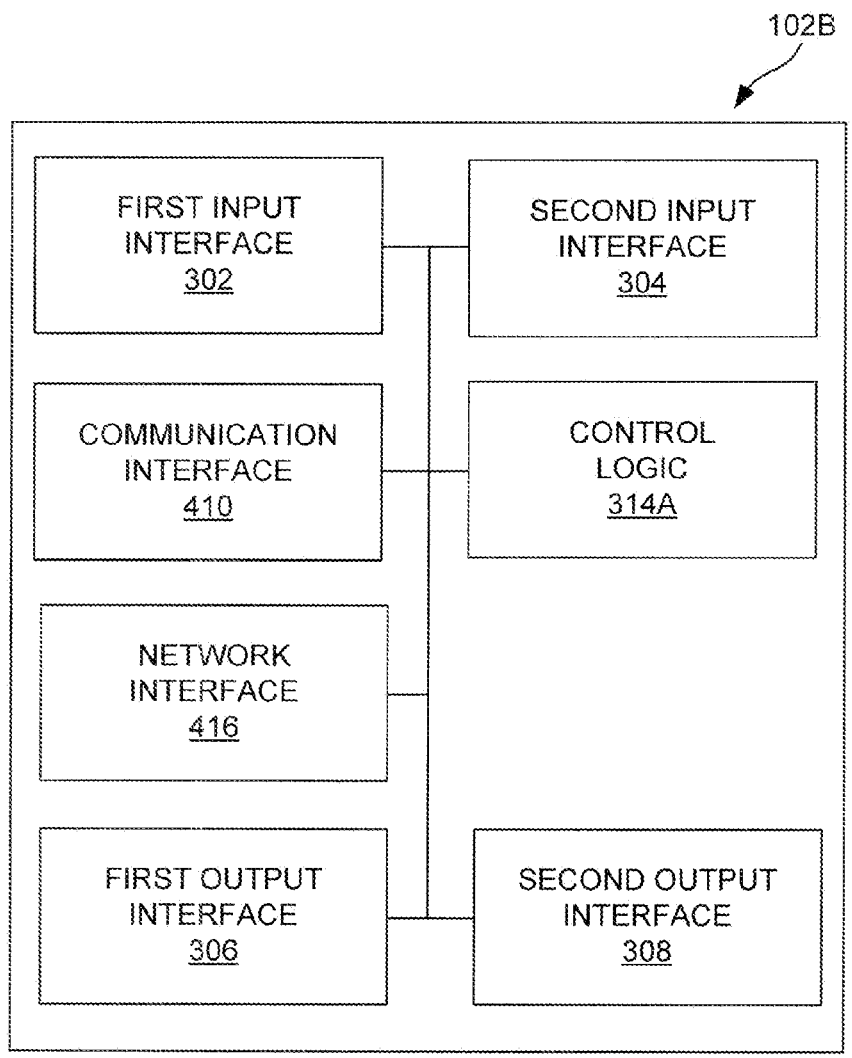
FIG. 4 illustrates another embodiment of an entertainment device of FIG. 1.

FIG. 4 illustrates another embodiment of an entertainment device of FIG. 1. The entertainment device 102B will be described in reference to the entertainment system 100 described in FIGS. 1 and 2. The entertainment device 102B includes a first input interface 302, a second input interface 304, a first output interface 306, a second output interface 308, a communication interface 410, control logic 314A and network interface 416. Each of these components is discussed in greater detail below. The entertainment device 102A may include other components, elements or devices not illustrated for the sake of brevity. The discussion of components common to FIG. 3 is omitted herein for the sake of brevity.

In at least one embodiment, the communication interface 410 is operable to communicate with first remote control 106 and the second remote control 108. In at least one embodiment, the communication interface 410 may comprise an RF wireless transceiver operable to communicate with both remote controls 106 and 108. In another embodiment, the communication interface 410 may comprise an IR transceiver operable to communicate with both the first and second remote controls 106 and 108. The communication interface 410 may also include any combination of IR and RF receivers, receivers and/or transmitters as appropriate to communicate with the first and second remote controls 106 and 108. The remote controls 106 and 108 may utilize the same communication protocol or disparate communication protocols, mediums and the like.

The communication interface 410 receives a signal from the second remote control 108. The signal is associated with a command for the presentation device 104. In at least one embodiment, the communication interface 410 further receives input from the user 110 assigning the command to the first remote control 106. The communication interface transmits the signal and the input to the control logic 314A for further processing. In at least one embodiment, the control logic 314A may receive the input directly from an associated input device, such as a keypad of the entertainment device 102B.

If the signal comprises an RF command, then the control logic 314A may be operable to identify the protocol associated with the signal. The control logic 314A then determines whether the first remote control 106 is configured to communicate commands encoded in the protocol. If the first remote control 106 is configured to communicate in the protocol, then the control logic 314A is operable to transmit a message to the first remote control 106, the message including information utilized by the first remote control 106 to reproduce the command when communicating with the presentation device 104. In at least one embodiment, the control logic 314A may determine that the first remote control 106 is not operable to communicate in the protocol of the command and may output a message for presentation to the user 110 regarding the same.

The control logic 314A may be operable to receive input from the user 110 identifying the presentation device 104. For example, the user 110 may provide input identifying the presentation device 104 as an XYZ model television. This identification may be stored by the entertainment device 104B to allow the user 110 to identify the commands for the presentation device 104 at a later date, e.g., to assign the commands for the presentation device 104 to a different remote control. In some embodiments, the control logic 314A may transmit the identification information, the signal and the selected button corresponding with the command to an external server. For example, a television provider may aggregate commands learned by television receivers of various users and utilize the information to populate an IR code database available to its subscribers. Thus, after the user 110 performs a learning process on their entertainment device 102B to learn commands for a television, DVD player, VCR or the like, another user may be able to load the commands onto their remote control without performing the same learning process.

The network interface 416 is operable to communicate with the external server (not shown) over a communication network. The network interface 416 may be operable to communicate with the external server over any type of wired or wireless communication network using any type of communication protocol, network topology and the like. In at least one embodiment, the network interface 416 communicates over an Ethernet network. The control logic 314A is operable to initiate communication of the aforementioned data to the external server 314A. In at least one embodiment, the control logic 314A may also download information, from the external server, via the network interface 416. For example, the external server may provide the control logic 314A with updated IR database codes, firmware updates and the like.

Figure 5:
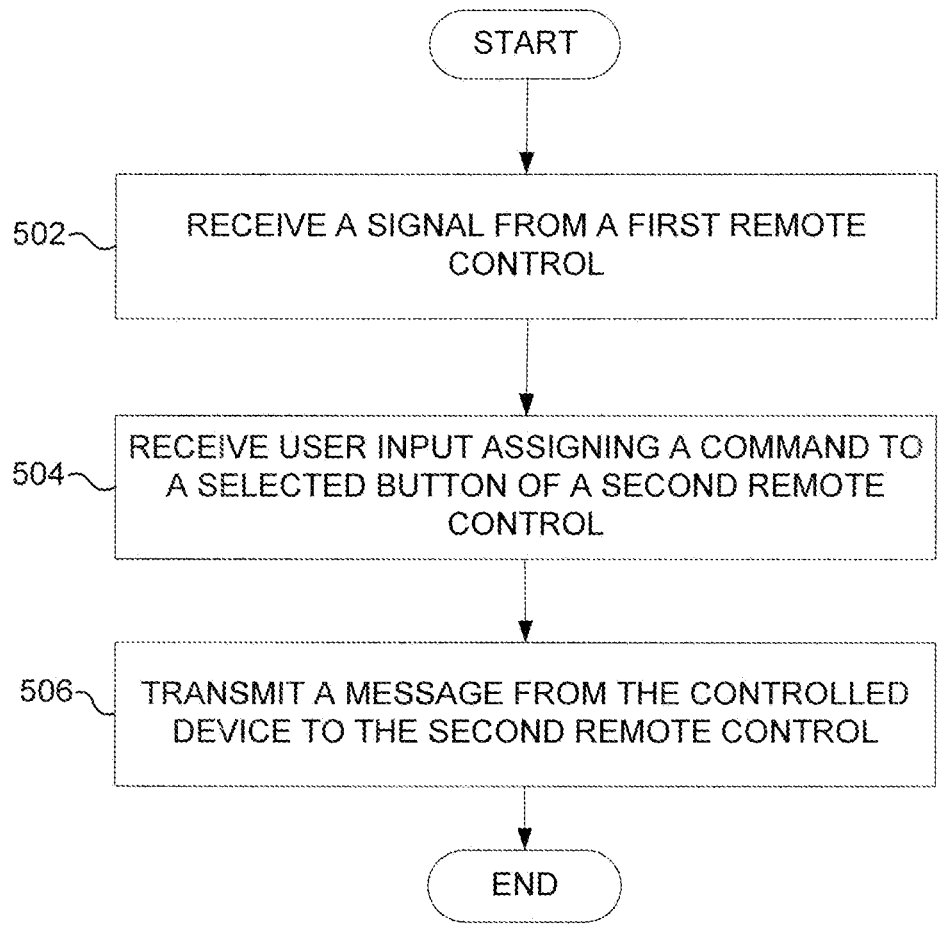
FIG. 5 illustrates an embodiment of a process for learning commands from a remote control.

FIG. 5 illustrates an embodiment of a process for learning commands from a remote control. The process of FIG. 5 may be operable by any type of controlled device, including television receivers. The process of FIG. 5 may not be all inclusive and may include other operations not illustrated for the sake of brevity.

The process includes receiving a signal from a first remote control at a first controlled device (operation 502). The signal is associated with a command for a second controlled device. For example, the first controlled device may comprise a satellite television receiver and the second controlled device may comprise a VCR. In at least one embodiment, the first remote control outputs an IR signal to remotely control the second controlled device (such as a "play" command) and the first controlled device includes an IR receiver to receive the IR signal from the first remote control.

The process further includes receiving user input, at the first controlled device, the user input assigning the command to a selected button of a second remote control (operation 504). Operation 504 may alternatively include assigning the user input to multiple combinations of buttons of the second remote control or other types of input devices of the second remote control. The user input may be provided by the first remote control, the second remote control, another remote control or via another input device associated with the first controlled device. The operations of 502 and 504 can occur in any order; e.g. 504 can occur either before or after 502.

The process further includes transmitting a message from the first controlled device to the second remote control (operation 506). The message includes information utilized by the second remote control to reproduce the signal responsive to actuation of the selected button to generate the command for the second controlled device. In at least one embodiment, the first controlled device and the second remote control are operable to exchange data over an RF communication link. Thus, the second remote control may include an RF transceiver for exchanging data with the entertainment device and may also include an IR emitter for transmitting commands to the second controlled device.

The process may optionally include transmitting the message to other remote controls associated with the first controlled device. For example, the first controlled device may be a multiple room DVR, with each room having an associated remote control. The DVR may receive input from a third remote control, requesting transmission of the commands utilized to control the second controlled device. Thus, the DVR may initiate transmission of a second message to the third remote control, the message including information utilized by the third remote control to reproduce the signal responsive to actuation of the button, allowing the third remote control to generate commands for the second controlled device.

In at least one embodiment, a user may be able to assign the command to a different button or command of the third remote control. For example, the DVR may include a menu displaying the original assignment of the commands for the second controlled device to the first remote control and may allow the user to swap the assignment of the commands on the third remote control. Thus, the first and third remote controls may be operable to output the same signal to control the second controlled device responsive to actuation of different buttons on each remote control.

Although specific embodiments were described herein, the scope of the invention is not limited to those specific embodiments. The scope of the invention is defined by the following claims and any equivalents therein.

I claim:

1. A method for learning commands from a remote control, the method comprising:
   receiving a signal from a first remote control at a first controlled device, the signal being associated with a command for a second controlled device;
   receiving user input, at the first controlled device, the user input assigning the command to a selected button of a second remote control;
   transmitting a message from the first controlled device to the second remote control, the message including information utilized by the second remote control to reproduce the signal responsive to actuation of the selected button to generate the command for the second controlled device;
   receiving user input identifying the second controlled device; and
   transmitting a second message from the first controlled device to an external server, the second message identifying the second controlled device, the signal and the selected button of the second remote control.

2. The method of claim 1, wherein receiving the signal further comprises:
   receiving the signal from the first remote control through an infrared receiver of the first controlled device.

3. The method of claim 1, wherein receiving the signal and transmitting the message further comprises:
   receiving the signal from the first remote control through a radio frequency transceiver of the first controlled device; and
   transmitting the message to the second remote control through the radio frequency receiver.

4. The method of claim 3, wherein receiving the signal from the first remote control through a radio frequency transceiver of the first controlled device and transmitting the message to the second remote control through the radio frequency receiver further comprises:
   identifying a protocol associated with the signal;
   determining whether the second remote control is configured to transmit commands encoded in the protocol; and transmitting the message to the second remote control responsive to determining that the second remote control is configured to transmit commands encoded in the protocol.

5. The method of claim 1, further comprising:
receiving second user input from a third remote control associated with the first controlled device; and
transmitting a second message from the first controlled device to the third remote control, the second message including information utilized by the third remote control to reproduce the signal responsive to actuation of the selected button to generate the command for the second controlled device.

6. An apparatus comprising:
a communication interface that receives a signal from a first remote control, the signal being associated with a command for another controlled device; and
control logic communicatively coupled to the communication interface operable to receive user inputs assigning the command to a selected button of a second remote control and identifying the controlled device;
the communication interface further operable to transmit a message to the second remote control, the message including information utilized by the second remote control to reproduce the signal responsive to actuation of the selected button to generate the command for the controlled device; and
a network interface operable to transmit a second message to an external server, the second message identifying the controlled device, the signal and the selected button of the second remote control.

7. The apparatus of claim 6, wherein the communication interface comprises an infrared receiver that receives the signal from the first remote control.

8. The apparatus of claim 7, wherein the communication interface comprises a radio frequency transceiver to transmit the message to the second remote control.

9. The apparatus of claim 6, wherein the communication interface comprises a radio frequency receiver to receive the signal from the first remote control.

10. The apparatus of claim 9, wherein the control logic is operable to:
identify a protocol associated with the signal;
determine whether the second remote control is configured to transmit commands encoded in the protocol; and
initiate transmission of the message to the second remote control through the radio frequency receiver responsive to determining that the second remote control is configured to transmit commands encoded in the protocol.

11. The apparatus of claim 6, wherein the control logic is operable to:
receive second user input from a third remote control; and
initiate transmission of a second message to the third remote control through the communication interface, the message including information utilized by the third remote control to reproduce the signal responsive to actuation of the selected button to generate the command for the controlled device.

12. An entertainment device comprising:
an infrared receiver that receives a signal from a first remote control associated with another controlled device, the signal being associated with a first command for the controlled device;
a wireless transceiver operable to receive second commands from a second remote control and third commands from a third remote control;
a first input interface that receives a first input stream;
a second input interface that receives a second input stream;
a first output interface communicatively coupled to the first input interface and the wireless transceiver that outputs the first input stream to a first presentation device based on the second commands;
a second output interface communicatively coupled to the second input interface and the wireless receiver that outputs the second input stream to a second presentation device based on the third commands;
control logic communicatively couple to the infrared receiver, the wireless receiver, the first and second input interfaces and the first and second output interfaces, the control logic operable to:
receive user input assigning the command to a selected button of the second remote control; and
transmit a message to the second remote control via the wireless transceiver, the message including information utilized by the second remote control to reproduce the signal responsive to actuation of the selected button to generate the command for the controlled device.

13. The entertainment device of claim 12, wherein the controlled device comprises the first presentation device.

14. The entertainment device of claim 12, wherein the control logic receives the user input from the second remote control via the wireless transceiver.

15. The entertainment device of claim 12, wherein the control logic outputs a selection menu, for presentation by the second presentation device, the selection menu prompting a user to identify the controlled device and wherein the entertainment device stores the identification of the controlled device in association with the signal and the identification of the selected button.

16. The entertainment device of claim 15, further comprising:
a network interface operable to transmit the identification of the controlled device, the signal and the identification of the selected button to an external server.

17. The entertainment device of claim 15, wherein control logic is operable to:
receive second user input from the third remote control; and
initiate transmission of a second message to the third remote control via the wireless transceiver, the second message including information utilized by the third remote control to reproduce the signal responsive to actuation of the selected button to generate the command for the controlled device.

18. The entertainment device of claim 15, wherein the control logic is operable to transmit a second message to the third remote control via the wireless transceiver, the second message including information utilized by the third remote control to reproduce the signal responsive to actuation of the selected button to generate the command for the controlled device.

* * * * *